United States Patent [19]

Pithouse et al.

[11] Patent Number: 4,631,098
[45] Date of Patent: Dec. 23, 1986

[54] HEAT-RECOVERABLE ARTICLE

[75] Inventors: Kenneth B. Pithouse, Lesulis, France; Thomas A. Kridl, Union City; James T. Triplett, Livermore, both of Calif.

[73] Assignee: Raychem Limited, London, England

[21] Appl. No.: 567,122

[22] Filed: Dec. 30, 1983

[30] Foreign Application Priority Data

Jan. 6, 1983 [GB] United Kingdom ............ 8300217
Jul. 23, 1983 [GB] United Kingdom ............ 8319855
Aug. 16, 1983 [GB] United Kingdom ............ 8322004

[51] Int. Cl.$^4$ .............................................. B32B 3/02
[52] U.S. Cl. ............................... 156/86; 138/155;
156/272.2; 174/DIG. 8; 264/342 R; 427/44;
427/421; 428/36; 428/229; 428/246; 428/257;
428/260
[58] Field of Search ............. 428/290, 258, 259, 257,
428/265, 36, 229, 228, 246, 260; 156/86, 272.2;
138/155; 174/DIG. 8; 264/342 R; 427/44, 421

[56] References Cited

U.S. PATENT DOCUMENTS

| 3,473,576 | 10/1969 | Amneus .................... 139/470 |
| 3,489,639 | 1/1970 | Spencer .................... 428/259 |
| 3,669,157 | 6/1972 | Woodall et al. .......... 139/387 |
| 3,945,493 | 3/1976 | Cardinal .................... 206/386 |
| 4,107,381 | 8/1978 | Butzow et al. ............ 428/259 |
| 4,168,197 | 9/1979 | Michimae et al. ........ 428/259 |
| 4,368,233 | 1/1983 | Barkis et al. .............. 428/290 |

FOREIGN PATENT DOCUMENTS

| 0046346 | 2/1982 | European Pat. Off. . |
| 1005951 | 9/1965 | United Kingdom . |
| 2022010 | 12/1979 | United Kingdom . |

Primary Examiner—James J. Bell
Attorney, Agent, or Firm—T. Gene Dillahunty; Herbert G. Burkard

[57] ABSTRACT

A heat recoverable article comprises a recoverable fabric and a polymeric layer of at least 0.03 mm thickness, and preferably unstressed. Such an article can be recovered by means of a torch to provide an environmental seal around substrates such as cables and pipes.

24 Claims, 4 Drawing Figures

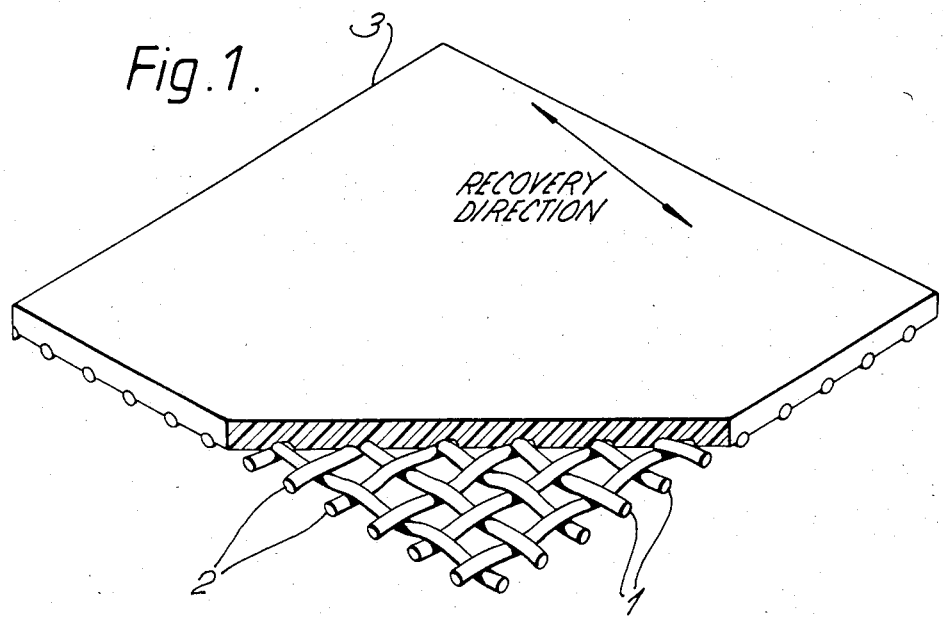
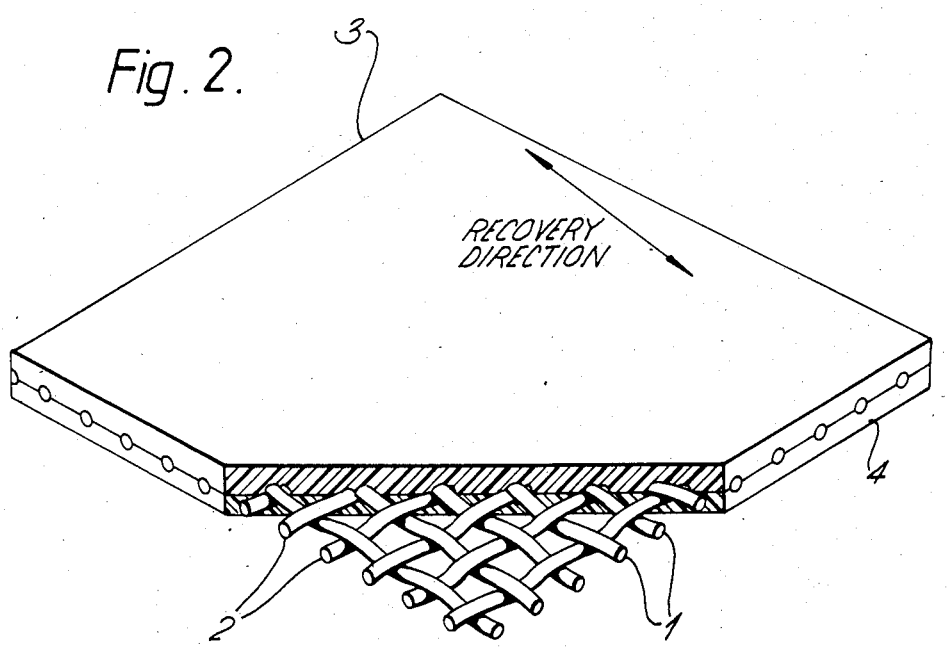

HEAT-RECOVERABLE ARTICLE

This invention relates to heat-recoverable articles.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensionally recoverability. One method of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. A further method comprises deforming a substantially non-crosslinked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

In other articles, an elastomeric member is held in a stretched state by a second member, which, upon heating weakens and thus allows the elastomeric member to recover. Heat-recoverable articles of this type are described, for example, in British Pat. No. 1,440,524, equivalent to U.S. Pat. No. 4,207,346, in which an outer tubular elastomeric member is held in a stretched state by an inner tubular member.

Heat-recoverable articles have found particular use in the environmental protection of elongate substrates such as for example splices in telecommunication cables.

In such applications, after the heat-shrinkable article has been positioned about the object to be enclosed it is recovered by heating the outer surface with a gas torch e.g. a propane torch.

It has been proposed, in U.S. Pat. No. 3,669,157 to Carolina Narrow Fabric Company and in Japanese patent specification No. 53-13805 to Matsushita, to provide heat-shrinkable tubular fabric articles which may be impregnated with certain thermosetting resins. However, we have found that the articles disclosed therein are very difficult to install by means of an open flame from a gas torch or similar heating tool such as a hot air gun because as soon as the heat-shrinkable fabric recovers the recoverable fibres therein tend to break under their own recovery forces.

The present invention provides a dimensionally heat-recoverable article for enclosing at least part of a substrate, which comprises a heat-recoverable fabric having fibres that will recover when heated and which have a tensile strength of at least 0.1 MPa at their recovery temperature, the fabric having an external surface that is coated with a layer of polymeric material, preferably unstressed, of at least 0.03 mm thickness, the polymeric material being softenable without flowing when heated to accommodate recovery of the article.

By "the recovery temperature" of polymeric heat-recoverable materials is meant that temperature at which the recovery of the polymeric material will go substantially to completion. In general, the recovery temperature will be the crystalline melting transition temperature if the polymer is crystalline or the glass transition temperature if the polymer is amorphous.

Whilst the polymeric material forming the outer layer softens at a temperature below the recovery temperature of the fibres in order to allow the fibres to recover, it should not melt since otherwise it would flow or drip off the article when heated. Preferably the layer of polymeric material is formed from a thermoplastic polymer that has been cross-linked to render it infusible, either chemically cross-linked or cross-linked by irradiation. The polymer material preferably has a complex dynamic viscosity of at least $10^2$, more preferably at least $10^3$ and most preferably at least $10^4$ poise at the recovery temperature of the fibres in order that it will not flow or drip during recovery, but preferably not more than $10^9$, more preferably not more than $10^8$ and especially not more than $10^7$ poise at the recovery temperature of the fibres. The particular maximum value for the complex dynamic modulus will depend on the recovery force of the fibres, but values significantly higher than $10^9$ poise may prevent the article from recovering. Complex dynamic viscosity is discussed for example in "Viscosity and flow measurement" by Van Wazer, Lyons, Kim and Colwell, Chapter 6, "Viscoeleasticity and its measurement Rheology" by H. Leaderman, Chapter 1 Vol 12 and in "Non-linear Viscoelastic solids", F. S. Lockett, Chapter 1 Academic press. Preferably the layer of polymeric material is formed from a thermoplastic polymer that has been cross-linked to render it infusible, for example either chemically cross-linked or cross-linked by irradiation.

The article acording to the invention has the advantage that, on the one hand it enables the beneficial properties of fabrics, such as high mechanical strength, to be used in a heat-shrinkable article, and, on the other hand, does not suffer from the inability to be recovered by means of a gas torch or other harsh heating device which is inherent in the previously proposed articles. The ability of heat-shrinkable articles to be recovered by means of such a device can be quantified with reference to a "torch index" (defined below) which is essentially the ratio of the time taken for the fabric or other heat-shrinkable article to fail due to overheating to the time taken for the fabric or article to recover, measured at a constant torching rate. Thus, the higher the value of the torch index, the more able in practice the article is to be recovered by means of, for example, a torch whereas a low value of the torch index means that the article is less suitable to being recovered by means of a torch. In practice, a torch index of less than 2 is inherently incapable of torch recovery. Articles having a high torch index will also find utility in high temperature environments and for use in installations involving other harsh heating.

We have found that fabrics formed from heat-recoverable fibres exhibit a relatively low value of the torch index, but by laminating the fabric in accordance with the present invention it is possible to increase the torch index of the recoverable fabric substantially. The reason for the increase of the torch index of the articles according to the invention is not understood since if the layer of polymeric material were simply acting as a thermal barrier the time to failure of the article through overheating and the time to recovery would be expected to increase in proportion to each other and accordingly the torch index would be expected to remain constant. Furthermore, it has most surprisingly been found that many articles according to the invention exhibit a higher torch index than conventional heat-shrinkable sheet products.

In general, it has been found that the torch index of the fabric composite structure increases as the thickness of the layer of polymeric material increases. Preferably the thickness of the layer of the polymeric material is at least 0.05 mm, more preferably at least 0.07 mm, especially at least 0.1 mm, more especially at least 1.5 mm and most especially at least 0.2 mm. As a matter of practice the maximum thickness of the layer is 2 mm, preferably 1 mm and most preferably 0.6 mm. If the layer has a thickness substantially greater than 2 mm there is a danger that its outer layer becomes scorched before the fabric has reached its recovery temperature.

The layer of polymeric material may be formed from a wide range of polymers provided that it softens on heating to accommodate recovery of the fabric. In order to accommodate recovery of the fibres the polymeric material preferably has a softening point of not more than 20° C. above the recovery temperature of the fibres, more preferably not higher than the recovery temperature of the fibres itself and especially at least 10° C. below the recovery temperature. Preferably, however, the softening point should not be lower than 40° C. below the recovery temperature of the fibres. Examples of thermoplastic polymers that may be used to form the layer include ethylene/vinyl acetate copolymers, ethylene/ethyl acrylate copolymers, polyethylenes including the linear low, low density and high density grades, polypropylene, polybutylene, polyesters, polyamides, polyetheramides, perfluoroethylene/ethylene copolymer and polyvinylidine fluoride. Considering the second class of materials this can include acrylonitrile butadiene styrene block copolymer, acrylic elastomers including the acrylates and methacrylates and their copolymers, e.g. polybutyl acrylate, and poly 2-ethylhexyl acrylate, the high vinyl acetate copolymers with ethylene (VAE's), polynorbornene, polyurethanes and silicone elastomers and the like.

The polymeric material used to form the layer may if it is fusible, be rendered infusible by cross-linking, e.g. by chemical cross-linking agents, by irradiation such as high energy electrons or gamma radiation, or UV radiation.

The polymeric material forming the layer may be transparent (at least to visible radiation) or completely opaque or it may have any opacity between these two extremes. If the opacity is increased, for example by blending a small quantity e.g. up to 5% by weight carbon black in the polymer material, the time taken both for the fabric to recover and for it to fail appear to be reduced, presumaby due to the increased heating from absorption of infrared radiation, with the result that the torch index is not significantly changed.

As will be appreciated, the matrix material can be selected for various other desirable properties inherent in the polymer material itself or provided with various additives such as antioxidants, ultra violet stabilizers, anti-tracking agents and the like.

As stated above, the polymeric material of the composite structure softens to enable the fibres to recover. Preferably, the material has a 20% secant modulus of at least $10^{-2}$ MPa and an elongation to break of at least 50%, preferably at least 100%, both properties being measured at the recovery temperature of the fibres. In addition the fabric composite preferably satisfies the following inequality at the recovery temperature of the fibres:

$X(1-R)/YR$ is less than 1, preferably less than 0.5 and especially less than 0.05 wherein

X is the 20% secant modulus of the polymeric material (measured at a strain rate of 300% per minute);

Y is the recovery stress of the fibres; and

R is the mean effective volume fraction of heat-recoverable fibres in the composite structure along a given direction based on the total volume of the composite structure, or relevant portion thereof.

In an alternative composite structure useful for the invention, the recoverable fabric provides the recoverable fibres of a recoverable composite structure comprising a cross-linked polymeric material and cross-linked recoverable fibres by virtue of which the composite structure is recoverable.

Such a recoverable composite structure can be made by applying to the cross-linked recoverable fibres the polymeric material, and then cross-linking the polymeric material.

The fibres may be cross-linked to increase their post-recovery strength, and a recovery stress of at least 1 MPa, preferably 1.5 to 5 MPa will be suitable. The polymeric material is desirably cross-linked to prevent it dripping or running during heat recovery, particularly by means of a torch. Too much cross-linking of the polymeric material will, however, reduce the recovery ratio of the composite. This may be a problem since a different cross-linking treatment may be required in the fibres and the polymeric material. This is a reason for the two cross-linking steps being carried out separately above. The problem may arise due to different cross-linking responses (beam response in the case of irradiation cross-linking) of the materials used for the fibres and the polymeric material, or due to the treatment undergone by the fibres and polymeric material. This second effect includes the reduced beam response of the fibres that results from their orientation produced by drawing to make them recoverable.

The composite structure may, nonetheless, be produced using a single cross-linking step if the beam response of the recoverable fibres relative to that of the polymeric material is such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymeric matrix material applied thereto, in which:

(a) the recoverable fabric comprises a cross-linked recoverable polyolefin having a recovery stress of 1.5 to 5 MPa; and (b) the matrix is cross-linked such that the recovery ratio available in the composite is at least 65% of that available in the free fabric, and the polymeric matrix material, per se, after irradiation has a room temperature elongation of 400–700% measured at a strain rate of 300% per minute.

Irradiation, in addition to providing one means of cross-linking, can provide other features in the composite structure. If the fibres are irradiated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

Also, or instead depending on the conditions under which the polymeric material is applied, some mechanical interlocking between the fibres and the polymeric material may be provided.

The fibres preferably have a minimum recovery stress of $10^{-1}$ MPa more preferably $5 \times 10^{-1}$ MPa and usually at least 1 MPa, especially 1.5–5 MPa at a temperature above the transition temperature of the fibres. There is in theory no upper limit of recovery stress, but in practice 200 MPa and more usually 100 MPa is the highest figure normally achievable with polymeric fibres.

The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97/gms/cc, an Mw of from $80 \times 10^3$ to $200 \times 10^3$ and an Mn of from $15 \times 10^3$ to $30 \times 10^3$.

Preferably the recovery temperature of the fibres is 60° C. or more, most preferably from 80° C. to 250° C., such as, for example, 120°–150° C.

When the fibre is cross-linked by irradiation it is convenient to incorporate the cross-linking step into manufacture of the fibre. The fibre can be extruded, stretched at a temperature below its melting temperature, preferably by an amount of from 800 to 2000%, then subjected to irradiation to effect cross-linking. A less preferred way of making the fibre is to extrude the fibre, irradiate to cross-link, then heat the fibre, preferably to above its melting temperature, stretching the fibre, and then cooling the stretched fibre. High density polyethylene fibres are preferably irradiated with a dose of from about 5 to about 35 megarads, preferably from about 5 to about 25 megarads, and in particular from about 7 to about 18 megarads, particularly from 10 to about 18 megarads. Usually the gel content of the cross-linked fibre is greater than 20%, preferably greater than 30%, most preferably greater than 40%. In practice, gel contents greater than 90% are not easily achievable.

The heat-recoverable fabric can, if desired, be made solely of heat-recoverable fibres as described above or can contain other fibres in addition to the heat-recoverable fibres. Where the fabric contains such other fibres, R in the inequality (1) relates only to the heat-recoverable fibre component. The fabric can be knitted, woven, non-woven, braided, or the like. In a preferred embodiment the fabric is a woven fabric. The woven fabric may contain solely heat-recoverable fibres or it can contain heat-recoverable fibres together with non-heat-recoverable fibres or filaments. For example, the fabric can contain heat-recoverable fibres in one direction and non-heat-recoverable fibers in the other. This produces a heat-recoverable fabric which is recoverable in only one direction. Examples of non-recoverable fibres include glass fibres, carbon fibres, wire or other metal fibres, polyesters, aromatic polymers, imides and ceramics. Particularly preferred fabrics are described in UK patent applications Nos. 8300219 and 8300222. The fabric can be woven in a pattern, for example, twill, broken twill, satin, sateen, Leno, plain, hop sack, sack, matt and various weave combinations in single or multiple ply weave eg 2 or 3 ply weaves. Preferably the fabric is one in which the heat-recoverable fibres have a high float for example from 6–20, as may be obtained by a satin weave, since this appears to lead to an increased torch index. It is also possible for the article to have a plurality of layers, eg 2 or 3 layers of fabric that are separated from one another by one or more layers of polymeric material.

The layer of polymeric material may be bonded to one side only of the heat-recoverable fabric if desired, either adhesively bonded, that is to say by chemical or physical surface interaction, or by mechanical interlocking. Preferably, however, the heat-recoverable fabric is embedded in the polymeric material, that is to say the polymeric material surrounds a major portion of the fibre surface area. Most preferably the fabric is totally surrounded by the polymeric material and especially so that there is a finite thickness of polymeric material on each side of the fabric. In this case the thickness of the polymeric layer for the purpose of the present invention is defined as the thickness of that part of the layer lying above the fabric. In the preferred articles according to the invention, the thickness of polymeric material on the internal surface of the article, that is on the side of the fabric opposite the side that will experience the torch flame, will be greater than the thickness of the polymeric layer on the external surface. The polymeric materials forming the layers on opposite sides of the fabric may be the same as or may differ from one another, and laminates of different polymeric layers may be used on one or both sides of the fabric. The difference between the polymeric materials on either side of the fabric may be one or more of the following: a difference in thickness, a difference in chemical type of plymer, and a difference in compounding or treatment of the same chemical type. There are two, perhaps conflicting, considerations regarding the provision of the polymeric material. Firstly, a layer is to be provided on the side of the fabric that will face the source of heat in order to increase the torch index, and secondly a matrix material may be provided (for example to render the fabric impervious) which must not prevent proper recovery of the fabric. The layer facing the heat is desirably cross-linked to prevent it running or dripping, but cross-linking of the matrix in general will inhibit recovery. In a preferred embodiment of the invention, therefore, a different extent of cross-linking is provided between a surface of the polymeric material facing the heat, and the remainder. This can be achieved for example by providing a thin outer cross-linked layer, or by providing a cross-linked layer on one side of the fabric and a non-cross-linked layer on the other side. Such a thin outer layer may be achieved by use of irradiation with very little penetration, such as electron curtain irradiation, or by laminating a thin cross-linked layer onto a surface of a composite material whose matrix is non-cross-linked or cross-linked to a lesser extent.

The differential cross-linking in any of these embodiments can be achieved by separate cross-linking steps for each layer that is to be cross-linked to a different extent. It may be preferred, however, to achieve this result by a single cross-linking step, especially irradiation; this can be done if the beam response of the different layers is (or is made to be) suitably different. For example the bulk of the matrix may be polypropylene (which does not cross-link in this way) and a surface layer only (or one side of the fabric only) be polethylene (which will cross-link). An other route is to load the various layers with prorads and/or antirads as appropriate. As a further feature a layer of adhesive or sealant which may be fusible, for example a hot-melt adhesive or a mastic, may be provided on the internal surface of the article. It has been found that increasing the thickness of the polymeric material on the internal surface of the article and/or providing it with a layer of sealant or adhesive also increases the torch index of the article.

Examples of hot melt adhesives that may be used include ethylene vinyl acetate copolymer based adhesives and polyamide based adhesives, Such adhesives are well known, and are described for example in U.S. Pat. Nos. 4,018,733 and 4,181,775. If desired, a heat-curable adhesive may be used as the adhesive. One such adhesive is described in UK Patent publication No. 2104800.

Because the heat recovery of the articles according to the invention is due to the recoverability of the fibres making up the fabric, the article as a whole need not be stretched during manufacture and so the layer of polymeric material may be substantially unstressed, that is to say it exhibits little or no tendency to recover of its own accord when heated. Thus, the articles according to the invention have a further significant advantage that they are largely insensitive to the presence of small surface scratches that may be caused by poor handling of the article before installation. In constrast, conventional heat-shrinkable articles that have been formed for example by cross-linking polymeric sheet and subsequent expansion, are found to fail by tearing during heat recovery if even very small scratches are formed on their surface.

The heat-recoverable fabric can be coated with the layer of polymeric material by a number of methods. For example, for articles that are made on a piece-by-piece basis it may be desirable to apply the polymeric material onto the fabric by a press lamination process, or if the articles can be formed from an indefinite length of fabric it is preferred to use an extrusion lamination technique in which a hot polymeric material is pressed onto the fabric and immediately quenched in order to prevent the fabric recovering, the operation being conducted as a continuous process. In either case, sufficient heat and pressure must be applied so that at least a major part of, and substantially all, the fabric is bonded to or interlocked with the polymeric material.

Other methods of coating the fabric with the polymeric material can be used, for example, impregnation, solution coating, slurry coating, powder coating, reactive pre-polymers, e.g. acrylic prepolymers activated by UV or peroxide, and the like. In any bonding method employed sufficient heat to cause the fabric to recover to any significant extent should be avoided, unless the fabric is suitably restrained from recovery.

Of the coating techniques used, extrusion lamination is preferred since, among other reasons, it appears to lead to articles exhibiting a higher torch index.

After the fabric is coated with the polymeric material, the material can then be cross-linked, preferably by high energy electron irradiation or gamma irradiation, and preferably to a dose in the range of from 0.5 to 15 Mrads, especially from 1 to 10 Mrads, especially from 3-7 megarads and most especially from 1 to 5 Mrads.

The articles may be formed in a number of configurations depending on their intended use. Preferred uses include environmental protection of cables and pipes or splices and joints therein. Thus, the articles may be tubular in shape or have multiple tubular portions for example as in the case of a cable break-out. If the article is intended to enclose part of an elongate substrate of which the ends are not readily accessible, the article may be formed as a so-called wraparound article in which the coated fabric has an open cross-section, e.g. it may be substantially in sheet form, and have two opposed edge portions extending perpendicularly to the direction of recovery, which edge portions are capable of being retained together against the recovery forces of the fabric. The article can simply be wrapped around the substrate to be enclosed and the edge portions be retained together so that the article will recover onto the substrate in the form of a sleeve on the application of heat. Wraparound articles formed from fabrics and suitable closure arrangements therefore are described in more detail in U.K. patent application No. 8300223. In the case of a wraparound article in which the coated fabric is in sheet form, the external surface of the fabric is defined as being the surface of the fabric that faces outwards once the article has been wrapped around the substrate and the opposed edge portions have been engaged. In general, the ability of a fabric, or fabric composite, to be penetrated without splitting allows portions to be joined together (for example to form a wrap around) by a mechanical joining arrangement that penetrates the fabric. Preferred arrangements are stitches or staples.

Two forms of article according to the invention will now be described by way of example with reference to the accompanying drawings in which:

FIG. 1 is a partly cut away perspective view of one form of article according to the invention;

FIG. 2 is a partly cut away perspective view of a second form of article;

Figure 3:
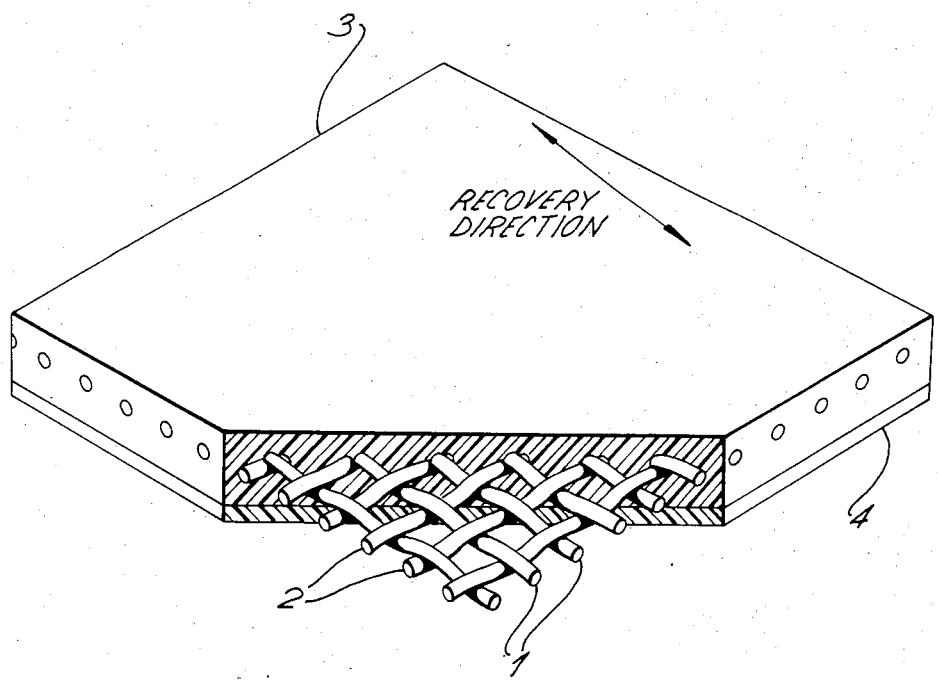
FIG. 3 is a partly cut away view of a third form of article.
Figure 4:
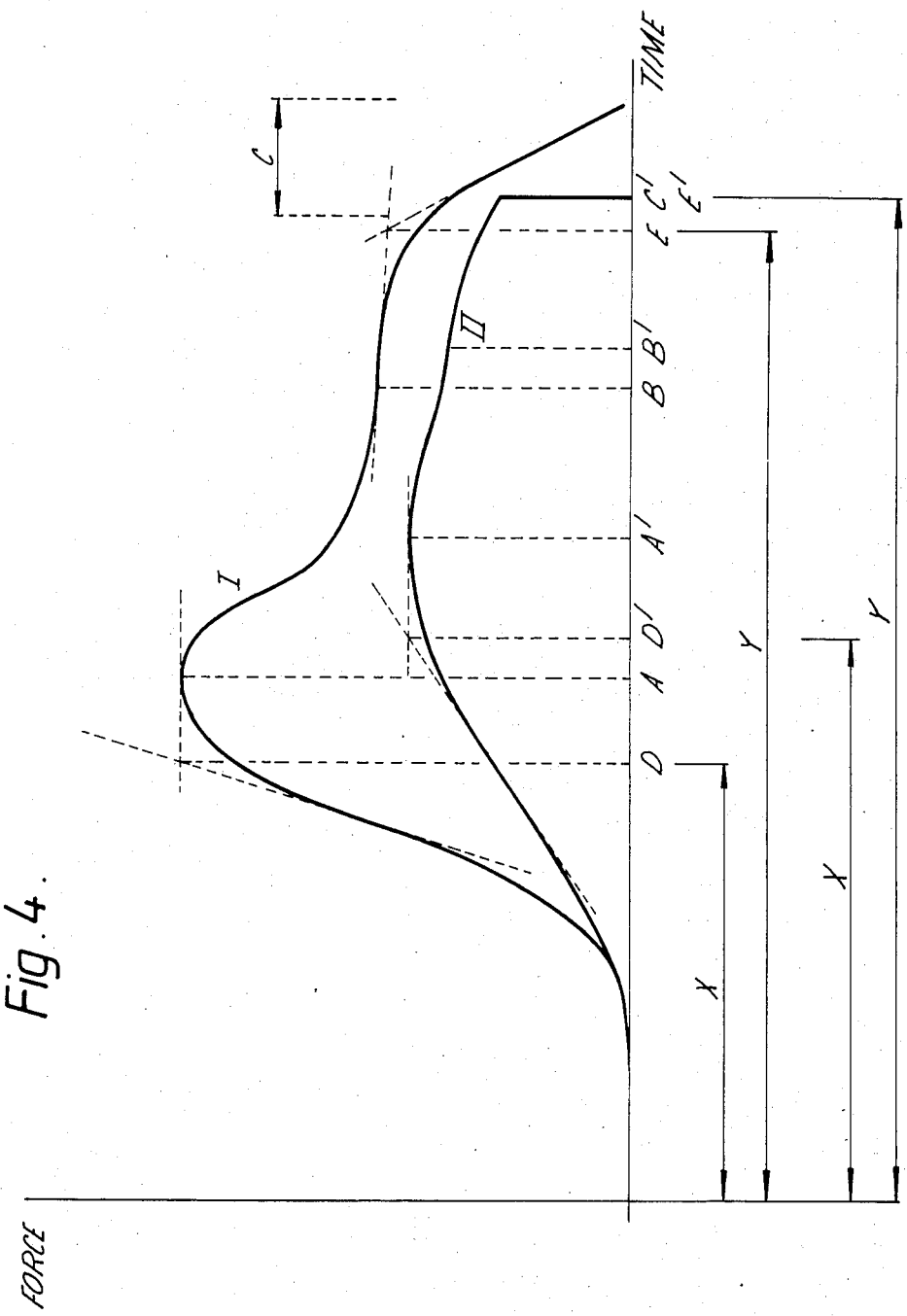
FIG. 4 is a graphical representation of the recovery forces against time of the fabric according to the invention and of a conventional heat-recoverable article.

Referring to FIGS. 1 to 3 of the accompanying drawings, FIG. 1 shows one form of fabric article in which a fabric 1, which comprises heat recoverable warp fibres 1 and heat-stable weft fibres 2 is coated with a heat softenable polymeric layer 3 on its external surface. FIG. 2 shows a similar fabric which, in addition, is provided with an underlying layer 4 of adhesive. FIG. 3 shows a similar form of article but in which the heat softenable polymeric layer 3 extends below the fabric so as to encapsulate the fabric entirely. In this form of article the relevant thickness of the polymeric layer is the thickness of that part of the layer that lies above the fabric.

The following Examples illustrate the invention. In the Examples the torch index was determined by the following procedure:

A square sample of the coated fabric of dimensions 100 mm×100 mm was placed between the jaws of an Instron (tradename) tensometer with the recoverable fibres extending vertically between the tensometer jaws and with the external surface of the fabric facing a propane gas torch positioned approximately 128 mm away from the surface of the fabric. The vertically extending side edges of the fabric sample were shielded from the torch by metal plates so that only a central portion of 96 mm width was exposed to the torch. Before the torch was lit a temporary metal plate was positioned to obscure the sample from the torch entirely. The torch was lit and was caused to move continuously from side to side across the face of the sample with a length of travel of about 260 mm and a speed such that the torch passed the sample about once per second. The temporary metal plate was removed and the force exerted by the recoverable fabric on the jaws of the tensometer at constant jaw separation was plotted as a functon of time.

A typical graph for the recovery force against time is shown in the accompanying drawing for a heat-recoverable fabric (plot I) and for a conventional heat-shrinkable sheet (plot II). This graph represents the force that, in practice, would be exerted by a heat-shrinkable splice case on the central portion of the splice where the splice case is not able to recover to a significant extent in view of the relatively large diameter of the central portion of the splice.

As the article is heated by the torch the recovery force of the article increases until it reaches a maximum value (points A,A') and then decreases, the rate of decrease of force reaching a minimum value (points B,B') shortly before failure of the sample. Failure of the conventional article in sheet form is observed as an abrupt decrease of the force to zero (point C') as the article tears, whereas failure of the article according to the invention is observed as a substantially linear decrease of the recovery force (range C) as progressively more fibres snap.

The point on the time axis corresponding to the intercept of the horizontal tangent touching the curve at maximum recovery force, with the straight line extrapolation of the maximum gradient of the curve (point D,D') is recorded as the "recovery time". The point on the time axis corresponding with the abrupt decrease in recovery force (point E') in the case of a conventional article, or, in the case of an article according to the invention, the point of intersection between the tangent at minimum rate of decrease in recovery with the tangent of decrease in recovery after the fibres begin to snap (point E), is recorded as the failure time.

The torch index of an article as used herein is defined as being the ratio of the failure time to the recovery time for that article (or, as shown in the graph, the value of Y/X).

EXAMPLES 1 TO 6

A broken twill fabric was formed from 0.29 mm diameter high density polyethylene monofilaments in the warp and 75 ECG glass yarn in the weft. The fabric had a weave density of (80/12) (i.e. 80 warp fibres per inch/12 weft fibres per inch, or 31.5/4.7 in cms). The fabric was irradiated to a dose of 15 Mrads of 1.5 MeV electrons at a dose rate of about 100 Mrads per minute. As a result the polyethylene fibres had a gel content of 37.3% measured after refluxing in xylene, and a 100% secant modulus of 0.50 MPa at 150° C. The fabric had a thickness of 0.6 mm. The fabric was torched by the procedure described above to determine its torch index and the results are shown in table I as Example 1.

The fabric was press laminated with clear low density polyethylene (M.F.I.=3.0, number average molecular weight Mn=14,800, weight average molecular weight Mw=114,800) with equal thicknesses of polyethylene on each side of the fabric and was then irradiated with high energy electrons to a further dose of 3 Mrads to form the products of Examples 2 to 6. The torch index values are shown in table I from which it can be seen that the coated fabrics are substantially more torchable than the uncoated fabric and the torch index tends to increase with thickness of the polyethylene coat.

TABLE I

| Example | Total Thickness (mm) | Layer Thickness (mm) | Torch Index |
|---------|----------------------|----------------------|-------------|
| 1 (comparative) | 0.6 | 0 | 2.9 |
| 2 | 0.8 | 0.1 | 5.1 |
| 3 | 1.07 | 0.24 | 5.7 |
| 4 | 1.3 | 0.35 | 4.6 |
| 5 | 1.47 | 0.44 | 6.4 |
| 6 | 1.55 | 0.48 | 6.4 |

The uncoated fabric (Example 1) exhibited a poor index and also it recovered and failed over a period of only a few seconds which made it unacceptable in practice.

EXAMPLES 6 TO 9

The procedure of Examples 2 to 6 was repeated with the exception that before press lamination, each side of the fabric had been extrusion laminated with the same clear low density polyethylene (from a melt temperature of 260° C.) and immediately quenched to prevent recovery of the fabric. The thickness of the extrusion laminated fabric was 0.75 mm. The results are shown in table II from which it can be seen that the extrusion laminated samples in general exhibit somewhat higher torch index values than the purely press laminated samples.

TABLE II

| Example | Total composite Thickness (mm) | Layer thickness of each layer (mm) | Torch Index |
|---------|-------------------------------|------------------------------------|-------------|
| 6 | 0.75 | 0.08 | 5.2 |
| 7 | 0.95 | 0.18 | 7.1 |
| 8 | 1.1 | 0.25 | 5.5 |
| 9 | 1.38 | 0.39 | 7.3 |

EXAMPLES 10 TO 14

The procedure of Examples 6 to 9 was repeated with the exception that the low density polyethylene that was press laminated onto the fabric to form the polymeric layer contained 2% by weight carbon black so that it was black and completely opaque. The results are shown in Table III.

TABLE III

| Example | Total composite Thickness (mm) | Layer thickness of each layer (mm) | Torch Index |
| --- | --- | --- | --- |
| 10 | 0.95 | 0.18 | 4.8 |
| 11 | 1.1 | 0.25 | 6.4 |
| 12 | 1.4 | 0.4 | 6.4 |
| 13 | 1.47 | 0.44 | 5.7 |
| 14 | 1.6 | 0.5 | 6.7 |

EXAMPLES 15 TO 16

Example 10 was repeated with the exception that two different weave designs were used, a plain weave and a satin weave. The results are shown in table IV from which it can be seen that the satin weave exhibits the highest torch index.

TABLE IV

| Example | Weave design | Fabric density | Total composite Thickness (mm) | Layer thickness of each layer (mm) | Torch Index |
| --- | --- | --- | --- | --- | --- |
| 10 | Broken Twill | | 0.95 | 0.18 | 4.8 |
| 15 | Satin | | 0.95 | 0.18 | 6.8 |
| 16 | Plain | | 0.95 | 0.18 | 5.5 |

EXAMPLE 17

Example 15 was repeated with the exception that the low density polyethylene press laminated layer was replaced with a medium density polyethylene. The torch index was 3.2.

EXAMPLES 18 TO 20

Example 10 was repeated with the addition that, before torching, a 5 to 6 cm long scratch was formed in the external surface of the article by pulling across the fabric in a direction perpendicular to the direction of recovery a 405 gramme weight having a smooth flat surface from which a sharp knife blade protruded by 0.13 to 0.14 mm.

By way of comparison a conventional heat-shrinkable sheet used for telecommunication cable splices was torched under the same conditions. The conventional heat shrinkable sheet was unscratched (example 19) and scratched (example 20). The results are shown in take V from which it can be seen that not only does the unscratched fabric article according to the invention have a higher torch index than the conventional sheet but also it is considerably more insensitive to the presence of a scratch whereas the conventional sheet is incapable of recovery when scratched.

TABLE V

| Example | Material | Scratch | Torch Index |
| --- | --- | --- | --- |
| 10 | Coated fabric | No | 4.8 |
| 18 | Coated fabric (as Ex. 10) | Yes | 4.25 |
| 19 (comparison) | Polyolefin sheet | No | 3.75 |
| 20 (comparison) | Polyolefin sheet | Yes | 1.29 |

We claim:

1. A dimensionally heat-recoverable article for enclosing at least part of a substrate, which comprises a fabric having fibres which will recover when heated and which have a tensile strength of at least 0.1 MPa at their recovery temperature, the fabric having an external surface that is coated with a layer of polymeric material of at least 0.03 mm thickness, the polymeric material being softenable without flowing when heated to accomodate recovery of the article.

2. An article as claimed in claim 1, wherein the layer of polymeric material has a thickness of at least 0.07 mm.

3. An article as claimed in claim 2, wherein the polymeric layer has a thickness of at least 0.1 mm.

4. An article as claimed in claim 3, wherein the polymeric layer has a thickness of at least 0.2 mm.

5. An article as claimed in claim 1 wherein the polymeric layer has thickness of not more than 2 mm.

6. An article as claimed in claim 1, wherein the polymeric layer has a softening point below the recovery temperature of the fibres.

7. An article as claimed in claim 1 wherein the fabric has a layer of polymeric material on each side thereof.

8. An article as claimed in claim 7, wherein the fabric has a layer of polymeric material on its internal surface that is of greater thickness than the layer of polymeric material on its external surface.

9. An article as claimed in claim 1, wherein the layer of polymeric material on the external surface of the fabric comprises an ethylene homo- or copolymer having a density of not more than 0.94 g cc$^{-1}$.

10. An article as claimed in claim 1, wherein the polymeric layer has been applied to the fabric by an extrusion coating process, by spray coating, by dip coating, or by sheet lamination.

11. An article as claimed in claim 1, wherein the heat-recoverable fibres are formed from high density polyethylene.

12. An article as claimed in claim 1, wherein the fabric includes dimensionally heat stable fibres.

13. An article as claimed in claim 12, wherein the dimensionally heat-stable fibres lie substantially perpendicularly to the heat-recoverable fibres.

14. An article as claimed in claim 1, wherein the fabric is woven with a plain, twill, broken twill or satin weave.

15. An article as claimed in claim 14, wherein the fabric has a satin weave.

16. An article as claimed in claim 1, wherein the polymeric material of the layer is substantially unstressed.

17. An article as claimed in claim 1, which is tubular in configuration.

18. An article as claimed in claim 1, which is in the form of a wraparound device having opposed edge portions which extend substantially perpendicularly to the direction of recovery of the article and which can be retained together in engagement.

19. A dimensionally heat-recoverable article comprising a composite structure which comprises a polymeric matrix material and heat-recoverable fibres by virtue of which the composite structure is recoverable, a layer at an outwardly facing surface of the matrix material being cross-linked to a greater extent than the remainder of the matrix material.

20. An article according to claim 19, wherein the matrix material is cross-linked by irradiation.

21. An article according to claim 20, wherein the different extents of cross-linking result from different beam responses of different regions of the matrix material.

22. A method of enclosing at least part of a substrate, which comprises:
   (a) surrounding said part with a dimensionally heat-recoverable article comprising a recoverable composite structure recoverable by virtue of a heat-recoverable fibre component thereof; and
   (b) heating the structure with an open flame or hot-air gun to cause the structure to recover into engagement with the substrate.

23. A method according to claim 22, wherein the structure comprises an article according to claim 1 or 19.

24. A method according to claim 22, wherein the substrate comprises a pipe or a cable or a join or splice therein.

* * * * *